United States Patent

Nakajima et al.

[11] Patent Number: 5,851,620
[45] Date of Patent: Dec. 22, 1998

[54] DISC METAL MOLD AND RECORDED DISC

[75] Inventors: Hiroshi Nakajima; Tetsuya Hasegawa, both of Sagamihara; Takafumi Niwa, Atsugi, all of Japan

[73] Assignee: Victor Company of Japan, Ltd., Yokohama, Japan

[21] Appl. No.: 769,592

[22] Filed: Dec. 18, 1996

[30] Foreign Application Priority Data

Dec. 26, 1995 [JP] Japan .................................. 7-351356

[51] Int. Cl.$^6$ ........................................................ B32B 3/00
[52] U.S. Cl. ........................ 428/64.1; 428/64.2; 428/64.4; 428/65.2; 428/913; 430/495.1; 430/945; 369/283; 425/190; 425/192 R; 264/107; 264/335
[58] Field of Search .................................. 428/64.1, 64.2, 428/64.4, 65.2, 913; 430/495.1, 945; 369/283, 282; 425/190, 192 R; 264/107, 335

[56] References Cited

U.S. PATENT DOCUMENTS

| | | | |
|---|---|---|---|
| 4,795,127 | 1/1989 | Asai | 249/103 |
| 4,979,891 | 12/1990 | Kitamura | 425/437 |
| 5,059,462 | 10/1991 | Kurisu et al. | 428/64.1 |
| 5,345,436 | 9/1994 | Higuchi | 369/282 |
| 5,607,705 | 3/1997 | Asai | 425/190 |

*Primary Examiner*—Elizabeth Evans
*Attorney, Agent, or Firm*—Michael N. Meller

[57] ABSTRACT

Improved disc metal mold provides an improved disc without a ring groove thereon. The improved disc metal mold has a fixed metal mold section and a movable metal mold section for forming a cavity therebetween. One of the fixed and movable metal molds has a stamper having an information signal surface on which an information signal is formed in a form of pits, wherein a fused resin is injected into the cavity to form a disc substrate having a center through hole at the center thereof. The disc metal mold includes the stamper having an center hole at a center thereof for retaining the stamper itself and a retainer for retaining the stamper to engage with the center hole of the stamper. The retainer has a slightly larger diameter at a top surface thereof than a diameter of the center hole of the stamper so that the top surface of the retainer is approximately flush with the information signal surface of the stamper by causing the top end thereof to engage with the center hole of the stamper. Thus, it is possible to provide a recorded disc having a seamless flush information surface without ring groove.

6 Claims, 6 Drawing Sheets

DISC METAL MOLD AND RECORDED DISC

BACKGROUND OF THE INVENTION

1. Field of the Invention:

The present invention relates to improvements of recorded discs such as a CD (compact disc) and a CD-ROM (read only memory) on which information is recorded, and a disc metal mold for manufacturing the recorded discs.

2. Description of the Related Art:

It is well known that a recorded disc (referred to as disc) such as an optical recorded medium, for instance, a CD (compact disc), a CD-ROM (read only memory) or a DVD (digital video disc), is capable of storing a large amount of information in a form of a plurality of pits of information signal on one surface or both surfaces of the disc. Upon operation, the disc is mounted in a reproducing apparatus and is rotated to be recorded/reproduced being scanned in a radial direction of the rotating disc by an optical pickup device of the apparatus.

The above disc is formed by injecting a resin having an excellent optical characteristic such as polycarbonate into a metal mold. Thereby, information signals which are precasted on a stamper of the metal mold, are transferred to the molded resin as a replica.

Next, a description is given of a disc forming device in the prior art referring to FIGS. 1 and 2.

FIG. 1 is a sectional view of a disc metal mold device in the prior art for molding a disc substrate.

FIG. 2 is a partially cutout perspective view showing a disc formed by using the metal mold device of the prior art shown in FIG. 1.

Generally, a disc forming metal mold device (referred to as "disc metal mold" hereinafter) 10 comprises a fixed metal mold "A" having a fixed platform 11 and a fixed core 13, and a movable metal mold "B" having a movable platform 17 and a movable core 19.

At a center of the fixed platform 11, there are provided a spool bushing 12 having an inlet 12a for introducing disc mold resin into a cavity 22. A stamper 14 has an information signal surface 14b and a center hole 14a at a center thereof. On the information signal surface 14b, there is concentrically formed series of pits for forming inverted replicas of the series of pits on a disc substrate 2 correspondingly with the information signals. A retainer 15 has a collar 15a protruding in the cavity 22 for supporting the stamper 14 at a center thereof. A flange 16 has a collar 16a for supporting the stamper 14 at a periphery thereof. Accordingly, the stamper 14 is attached on the fixed core 13 provided on the fixed platform 11 by causing an outer peripheral portion and an inner peripheral portion of the center hole 14a thereof to engage with the collar 16a of the flange 16 and the collar 15a of the retainer 15, respectively. It is noted that on the outer peripheral portion of the stamper 14 engaged with the collar 16a of the flange 16, there is no series of pits being provided.

On the other hand, a punch 18 for punching a center through hole 5 in the disc substrate 2 is slidably snug-fitted in directions of arrows "a" and "b" in a movable platform 17, and a top end of the punch 18 opposes a bottom of the spool bushing 12. The movable core 19 is also attached on the movable platform 17 by causing an outer peripheral part and an inner peripheral part thereof to engage respectively with an outer peripheral retainer 21 and an inner peripheral retainer 20 through which a part of the punch 18 is protruding into the cavity 22. Further, both top surfaces of the movable core 19 and the inner peripheral retainer 20 are polished to be kept flush each other, and the upper surface of the outer peripheral retainer 21 is made higher than both the top surfaces of the movable core 19 and the inner peripheral retainer 20 and contacts with a top of the collar 16a of the flange 16. It should be noted that the outer and inner peripheral retainers 21, 20 are provided in a detachable manner on the movable platform 17 so as to enable the top surface of the movable core 19 to be polished.

Accordingly, a space formed between the movable core 19 and the stamper 14 behaves as the cavity 22 for molding the disc substrate 2. Upon an operation, fused resin material is filled to the cavity 22 from the inlet 12a of the spool bushing 12 to form the disc substrate 2 (FIG. 2) as a replica, and the center through hole 5 is formed therein by moving the punch 18 in a direction of an arrow "a" through the disc substrate 2. As a result the disc substrate 2 shown in FIG. 2 is molded.

Through the above operation, the information signal surface 14b of the stamper 14 is transferred to the disc substrate 2 as an information signal surface 2c of the disc substrate 2, the protruding part of the collar 15a of the retainer 15 as a ring groove 2b of the disc substrate 2, and the distal end surface of the spool bushing 12 as an inner flat surface 2a of the disc substrate 2.

After the disc substrate 2 taken out from the disc metal mold 10 is provided with a reflecting layer 3 covering the information signal surface 2c, the protecting layer 4 is coated on the entire reflecting layer 3, the inner flat surface 2a and the ring groove 2b, then the label 6B is printed on an outer flat area 4c, resulting in a disc 1B of the prior art shown in FIG. 2.

It is noted that in FIG. 2, the inner flat surface 2a, the ring groove 2b and the information signal surface 2c which are coated with the reflecting layer 3 are respectively denoted with another reference characters (3a), (3b) and (3c), and same parts which are coated with the protecting layer 4, are further denoted with other reference characters 4a, 4b, 4c.

As clearly understood from the above description, the ring groove 2b (3b, 4b) is inevitably formed on the disc substrate 2 as long as employing such a disc manufacturing method as attaching the stamper 14 by causing the inner periphery of the center hole 14a thereof to engage with the collar 15a of the retainer 15 and making the center through hole 5 of the disc 1B in the disc metal mold 10. The ring groove 2b (3b, 4b) has dimensions of an inner diameter of 35 mm, a groove width of 1.0 mm, and a groove depth of 0.4 mm.

In the disc 1B of the prior art as shown in FIG. 2, the label 6B is usually printed only on the outer flat surface 4c, however, there is a demand for printing the label 6B on the entire surface of the disc 1B leaving the center through hole 5. However, there is a problem that the ring groove 4b prevents the label 6B from being printed in good appearance.

As a countermeasure, there is proposed a disc manufacturing method in Japanese Laid-open Publication 5-205320/93, wherein the ring groove 2b is filled with a resin, for instance, an ultraviolet ray curing resin, to eliminate the above problem.

However, according to the above method, it is necessary to provide other production processes such as a resin filling process and an ultraviolet ray irradiation process for curing the resin. This causes a production cost increase of the disc.

SUMMARY OF THE INVENTION

Accordingly, a general object of the present invention is to provide a disc and a disc metal mold in which the above disadvantages have been eliminated.

A specific object of the present invention is to provide a disc metal mold capable of producing a disc having no ring groove.

A more specific object of the present invention is to provide a disc metal mold device having a fixed metal mold section and a movable metal mold section for forming a cavity therebetween, at least one of the fixed and movable metal mold sections to be provided with a stamper having an information signal surface on which an information signal is formed in a form of pits and a center hole at a center of the stamper for retaining thereof in the disc metal mold, wherein a fused resin is injected into the cavity to form a disc substrate having a center through hole at the center thereof, the disc metal mold comprising: a retainer for retaining the stamper, the retainer having a slightly larger diameter at a top surface thereof than a diameter of the center hole of the stamper so that the top surface of the retainer is approximately flush with the information signal surface of the stamper by causing a top end of the retainer to engage with the center hole of the stamper.

Another and more specific object of the present invention is to provide a recorded disc having a disc substrate, wherein the disc substrate has a seamless flush information signal surface over an entire top surface of the disc substrate leaving a center through hole only on the recorded disc, and a reflecting layer and a protecting layer are formed on the flush information signal surface, and a label is printed on the protecting layer.

Other and more specific object of the present invention is to provide a recorded disc having two sheets of disc substrates, wherein each of the two sheets of disc substrates has a seamless flush information signal surface extended over an entire top surface of the disc substrate leaving a center through hole only on each disc substrate, and a reflecting layer and a protecting layer are formed on the flush information signal surface, and the two sheets of the disc substrates are laminated together so that the respective flush information signal surfaces of the two sheets of the disc substrates face each other.

Other objects and further features of the present invention will be apparent from the following detailed description.

DETAILED DESCRIPTION OF THE PREFERRED EMBODIMENT

Figure 1:
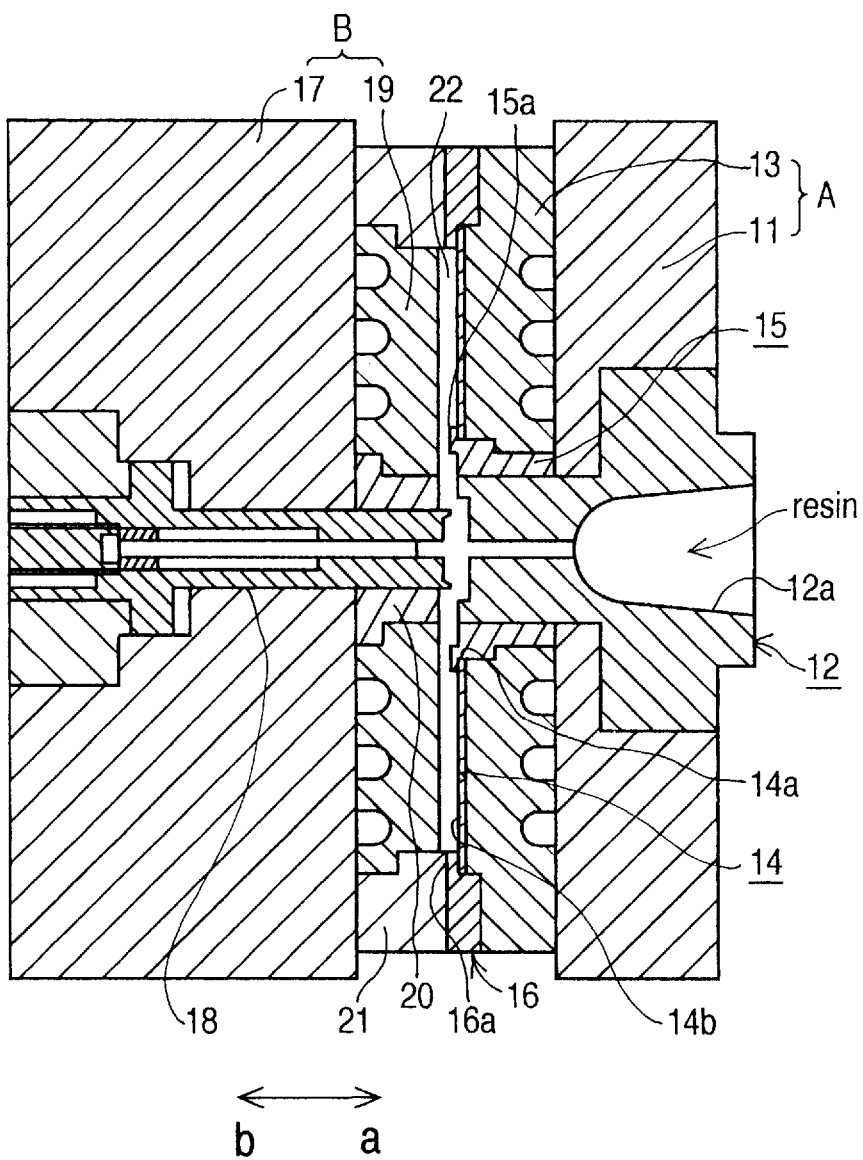
FIG. 1 is a sectional view of a disc metal mold in the prior art for molding a disc substrate.
Figure 2:
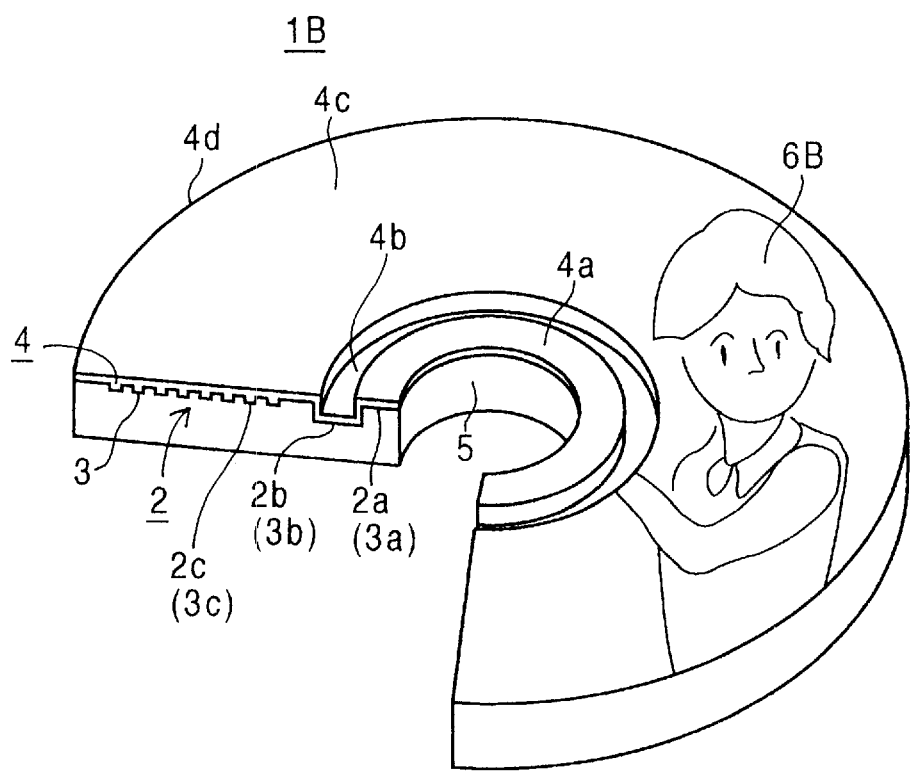
FIG. 2 is a partially cutout perspective view showing a disc formed with the metal mold of the prior art shown in FIG. 1.

Description will be given of an embodiment according to the present invention referring to FIGS. 3 to 6, wherein the like reference characters as shown in FIG. 1 and FIG. 2 designate like or corresponding parts throughout the drawings, and detailed descriptions of the like parts are omitted for simplicity except for new parts employed.

Figure 3:
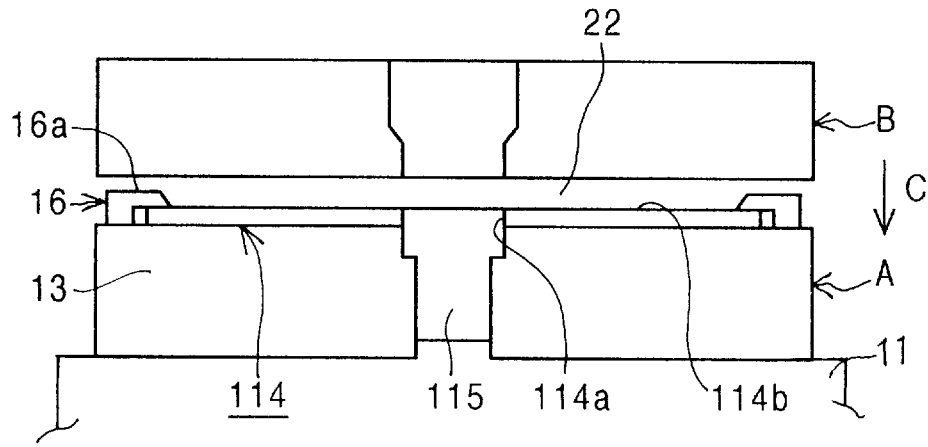
FIG. 3 is a sectional view showing a disc metal mold of an embodiment of the present invention.

FIG. 3 is a sectional view showing a disc metal mold of an embodiment of the present invention.

Figure 4:
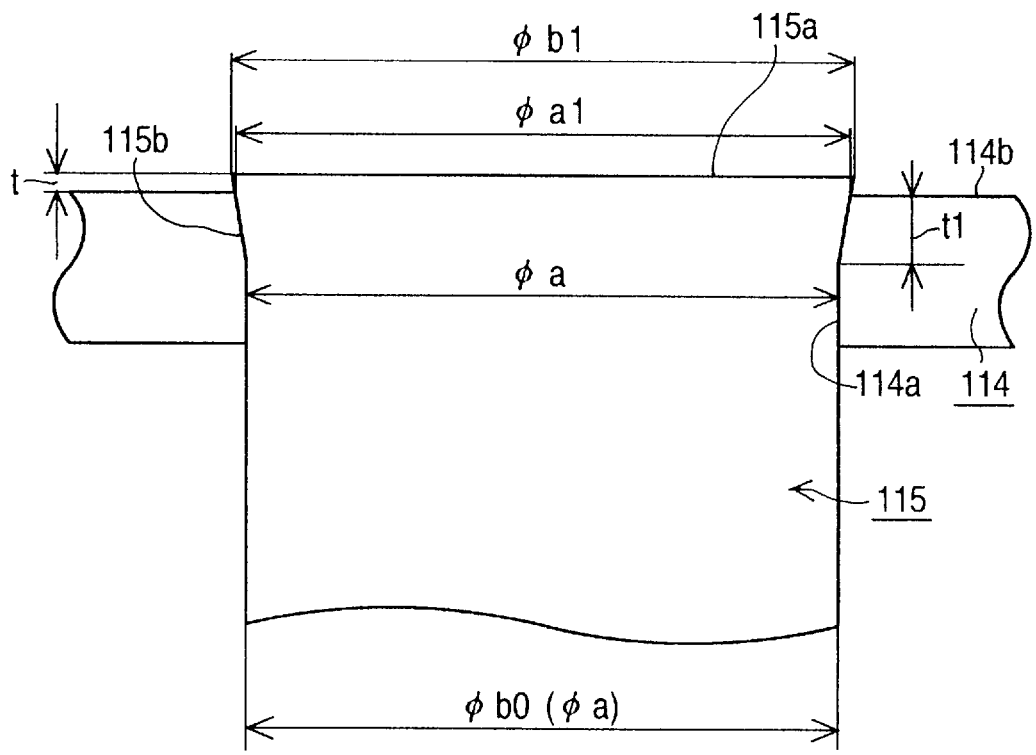
FIG. 4 is a partially enlarged sectional view showing a stamper and a retainer of the disc metal mold shown in FIG. 3 in the present invention.

FIG. 4 is a partially enlarged sectional view showing a stamper and a retainer of the disc metal mold shown in FIG. 3 in the present invention.

Figure 5:
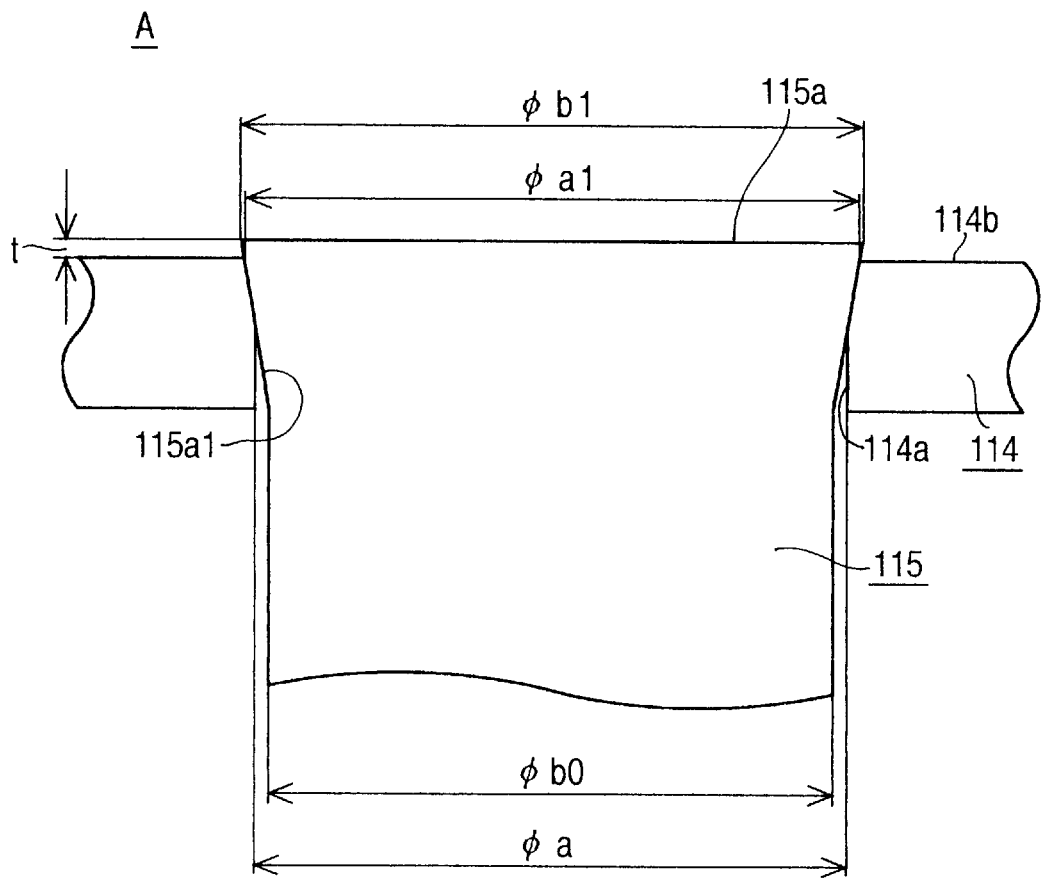
FIG. 5 is a sectional view showing a disc metal mold of another embodiment of the present invention.

FIG. 5 is a sectional view showing a disc metal mold of another embodiment of the present invention.

Figure 6:
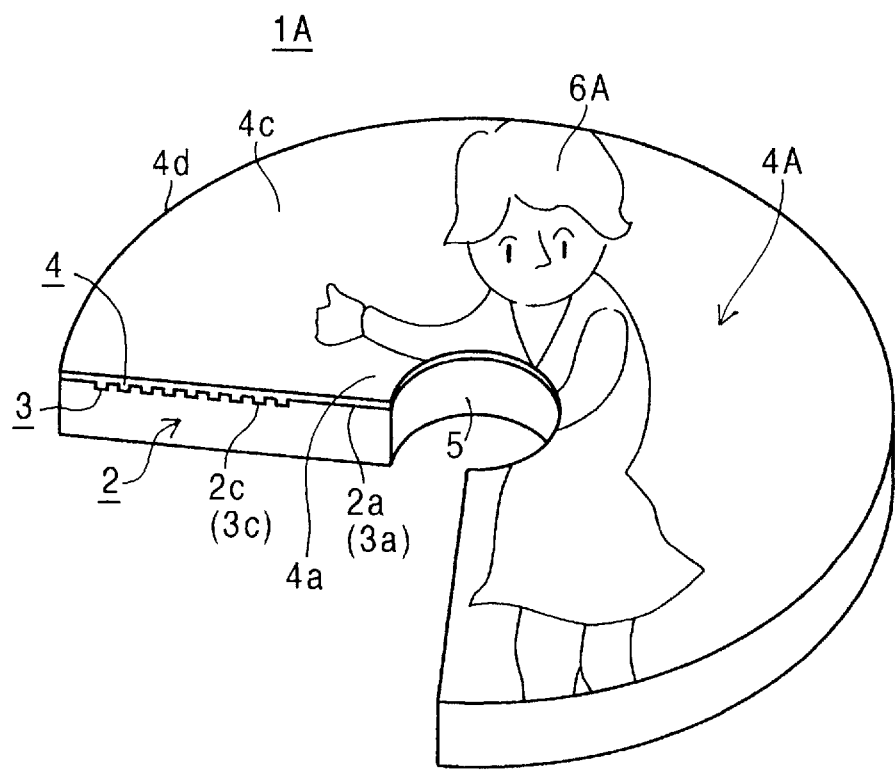
FIG. 6 is a perspective view of a disc of the present invention.

FIG. 6 is a perspective view of a disc of the present invention.

Referring to FIG. 3, a reference numeral 100 designates a disc metal mold of the present invention which has the same construction as that of the disc metal mold 10 shown in FIG. 1 except for a stamper configuration and an attachment method thereof.

The disc metal mold 100 generally comprises a fixed metal mold "A" having the fixed platform 11 and the fixed core 13, and a movable metal mold "B" having the movable platform 17 and the movable core 19 as shown in FIG. 1. However, the movable metal mold "B" is not depicted in FIG. 3 because it has the same construction as that of the prior art. The movable metal mold "B" is moved in a direction of an arrow C to form the cavity 22 as the fixed metal mold "A" and the movable metal mold "B" meet together. In this embodiment, a stamper 114 which is one of the constructive features of the present invention, is attached to the fixed core 13 provided on the fixed platform 11 by causing an outer peripheral portion of the stamper 114 to engage with the color 16a of the flange 16 and by causing an center hole 114a itself of the stamper 114 to engage with a retainer 115 of the present invention.

Specifically, as shown in FIG. 4, the stamper 114 of the present invention is made of a thin layer material having a thickness of, for instance, 245 $\mu$m and carrying pits of an information signal by using an electroforming device. An outer periphery and an inner periphery (the center hole 114a) of the stamper 114 are formed by pressing the thin layer material with a punch from a side of an information signal surface 114b having the series of pits so as to have a predetermined shape.

It is confirmed that the center hole 114a has a tapered wall owing to a shearing force by pressing. Specifically, the tapered hole has a minimum diameter $\phi$a corresponding to a standard diameter at a depth of t1 (150 $\mu$m) and a maximum diameter $\phi$a1 at the information signal surface 114b having the series of pits. This maximum diameter $\phi$a1 can be verified by using a surface shape measuring device.

On the other hand, the retainer 115 has a tapered portion 115b having a tapered angle corresponding to the tapered wall of the center hole 114a and a top surface 115a having a diameter $\phi$b1 which is made larger than the maximum diameter $\phi$a1 of the center hole 114a to allow the retainer 115 to engage securely with a peripheral portion of the center hole 114a of the stamper 114.

Specifically, the diameter $\phi$b1 of the top surface 115a of the retainer 115 is determined as follows:

$$\phi b1 = \phi a \times 1.001 \sim \phi a \times 1.01 \tag{1}$$

By causing the diameter $\phi$b1 of the top surface 115a of the retainer 115 to have a value represented by the formula (1), it is possible to make the diameter $\phi$b1 of the top surface 115a larger than the maximum diameter $\phi$a1 of the center hole 114a. In this case, a diameter $\phi$b0 of a base portion of the retainer 115 corresponding to the fixed core 13 has approximately the same diameter as the diameter $\phi$a of the center hole 114a.

A preferable value for the diameter $\phi$b1 of the top surface 115a of the retainer 115 is shown as follows:

$$\phi b1 = \phi a \times 1.002 \sim \phi a \times 1.006 \quad (2)$$

Thereby, it is possible enough to cause a portion of the top surface 115a of the retainer 115 to engage with the peripheral portion of the center hole 114a which is somewhat deformed, within a limitation of an elastic deformation of the stamper 114, resulting in a secure centering of the stamper 114. Further, it is possible to suppress a protruding amount "t" of the top surface 115a of the retainer 115 into the cavity 22 within 20 $\mu$m only. This enables to form the disc substrate 2 having no ring groove.

As shown in FIG. 6, a disc 1A of the present invention has no ring groove on the information signal surface 2c having a replica of the information signal surface 114b of the stamper 114, wherein the reflecting layer 3 and the protecting layer 4 and the label 6A are formed on the information signal surface 2c having series of pits in this order on an entire flat surface 4A leaving the center through hole 5.

Accordingly, it is possible to eliminate the resin filling process for the ring groove as described in the prior art, resulting in a reduction of production cost by simplifying the production process and resulting in an enhancement of the value of the disc because of printing a high quality label thereon.

There is shown another embodiment the disc metal mold of the present invention in FIG. 5.

In this embodiment, the center hole 114a has the same tapered wall having the maximum diameter $\phi$a1 and the minimum diameter $\phi$a as mentioned in the foregoing, and the retainer 115 for engaging with the center hole 114a has the diameter $\phi$b1 of the top surface 115a satisfying the formulas (1) and (2) as mentioned in the foregoing, but a tapered surface 115a1 extends approximately to the thickness of the stamper 114.

For this tapered configuration, a diameter $\phi$b0 of the main part of the retainer positioned corresponding to the fixed core 13 is made as follows:

$$\phi b0 = \phi a \times 0.999 \sim 0.990 \quad (3)$$

Accordingly, in this embodiment it is possible to retain the tapered wall of the center hole 114a by the tapered portion 115b (115a1) of the retainer 115, and the protruding amount "t" of the top surface 115a of the retainer 115 into the cavity 22 can be suppressed within 20 $\mu$m only. Further, it is possible to fix the stamper 114 to be securely center-aligned even when the tapered wall of the center hole 114a has a variation, resulting in forming a reflecting layer 3, a protecting layer 4 and a label 6A having a high quality on the information signal surface 2c of the disc 1A.

Figure 7:
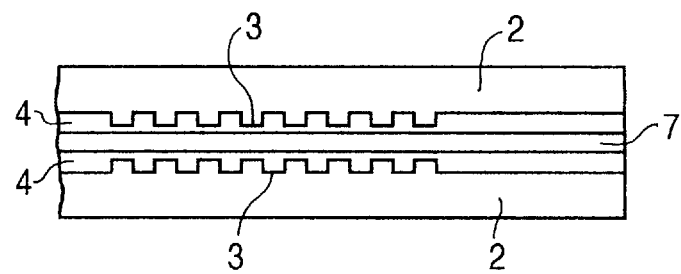
FIG. 7 is a sectional view of a disc composed of 2 sheets of the disc substrates formed by using the disc metal mold of the present invention.

FIG. 7 is a sectional view of a disc composed of 2 sheets of the disc substrates formed by using the disc metal mold of the present invention.

As shown in FIG. 7, after respective two sheets of the disc substrates 2 formed by using the metal mold are provided with the reflecting layer 3, the protecting layer 4 on the information signal surface 2c, they are laminated together with a bond 7 into a disc. This renders an easy lamination because the two sheets of the disc substrates 2 have no ring groove.

Figure 8:
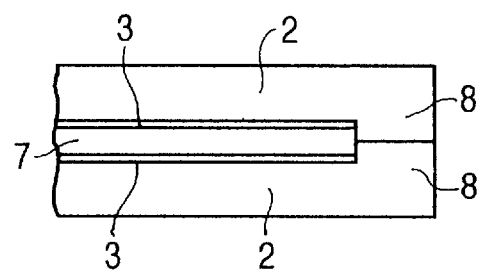
FIG. 8 is a sectional view of a variation of the disc composed of 2 sheets of disc substrates formed by using the disc metal mold of the present invention.

For the two sheets of the disc substrates 2, a flat protruding portion 8 may be preliminarily provided at the periphery of the disc as shown in FIG. 8. This effectively prevents the bond 7 from flowing out therefrom.

FIG. 8 is a sectional view of a variation of the disc composed of 2 sheets of disc substrates formed by using the disc metal mold of the present invention.

As mentioned in the foregoing, according to the disc metal mold of the present invention, it is easy to center-align the stamper on a retainer by retaining the center hole itself of the stamper with the retainer. In addition, it is possible to obtain a disc having a seamless flush surface without a ring groove. This enables to form a flat reflecting layer and a flat protecting layer, resulting in a printed label having a high quality on the protecting layer without being interrupted by the ring groove.

What is claimed is:

1. A disc metal mold having a fixed metal mold section and a movable metal mold section for forming a cavity therebetween, at least one of the fixed and movable metal mold sections to be provided with a stamper having an information signal surface on which an information signal is formed in a form of pits and a center hole at a center of the stamper for retaining thereof in the disc metal mold, wherein a fused resin is injected into the cavity to form a disc substrate having a center through hole at the center thereof, the disc metal mold comprising:

a retainer for retaining the stamper, the retainer having a slightly larger diameter at a top surface thereof than a diameter of the center hole of the stamper so that the top surface of the retainer is approximately flush with the information signal surface of the stamper by causing a top end of the retainer to engage with the center hole of the stamper.

2. A disc metal mold as claimed in claim 1, wherein the center hole of the stamper has a tapered wall and the top end of the retainer has a tapered cylinder shape corresponding to a tapered wall of the center hole of the stamper.

3. A recorded disc having a disc substrate integrally formed with a resin using the disc metal mold as claimed in claim 1, comprising:

a seamless flush surface except for a center through hole;
an information signal surface being provided on the seamless flush surface of the disc substrate, with the information signal surface having a replica of the information signal surface of the stamper provided on the disc metal mold;
a reflecting layer formed on the information signal surface;
a protecting layer formed on the reflecting layer, and
a label printed on the protecting layer.

4. A recorded disc having two disc substrates made by using the disc metal mold as claimed in claim 1, comprising:

each of the two disc substrates being integrally formed with a resin by using the disc metal mold, and having a seamless flush surface except for a center through hole;
an information signal surface being formed on the seamless flush surface of each of the two disc substrates, the information signal surface having a replica of the signal surface of the stamper provided on the disc metal mold;
a reflecting layer formed on the information signal surface, and
a protecting layer formed on the reflecting layer,
wherein the two disc substrates are laminated together so that the flush information signal surfaces of the two disc substrates face to each other.

5. A recorded disc having a disc substrate integrally formed with a resin using a disc metal mold comprising:
   a seamless flush surface except for a center through hole;
   an information signal surface being formed on the seamless flush surface of the disc substrate, the information signal surface having a replica of an information signal surface of a stamper provided on the disc metal mold;
   a reflecting layer formed on the information signal surface;
   a protecting layer formed on the reflecting layer, and
   a label printed on the protecting layer.

6. A recorded disc having two disc substrates, comprising:
   each of the two disc substrates being integrally formed with a resin by using the disc metal mold, and having a seamless flush surface except for a center through hole;
   an information signal surface being formed on the seamless flush surface of each of the two disc substrates, the information signal surface having a replica of an information signal surface of a stamper provided on the disc metal mold;
   a reflecting layer formed on the information signal surface, and
   a protecting layer formed on the reflecting layer,
   wherein the two disc substrates are laminated together so that the flush information signal surfaces of the two disc substrates face to each other.

* * * * *